US010552402B2

(12) United States Patent
Eluri et al.

(10) Patent No.: US 10,552,402 B2
(45) Date of Patent: Feb. 4, 2020

(54) DATABASE LOCKLESS INDEX FOR ACCESSING MULTI-VERSION CONCURRENCY CONTROL DATA

(71) Applicants: Amarnadh Sai Eluri, Pleasanton, CA (US); Ivan Schreter, Malsch (DE); Andreas Tonder, Weinheim (DE)

(72) Inventors: Amarnadh Sai Eluri, Pleasanton, CA (US); Ivan Schreter, Malsch (DE); Andreas Tonder, Weinheim (DE)

( * ) Notice: Subject to any disclaimer, the term of this patent is extended or adjusted under 35 U.S.C. 154(b) by 788 days.

(21) Appl. No.: 14/553,723

(22) Filed: Nov. 25, 2014

(65) Prior Publication Data
US 2016/0147811 A1    May 26, 2016

(51) Int. Cl.
*G06F 16/23* (2019.01)
*G06F 16/22* (2019.01)

(52) U.S. Cl.
CPC ...... *G06F 16/2308* (2019.01); *G06F 16/2228* (2019.01)

(58) Field of Classification Search
CPC ......... G06F 17/30353; G06F 17/30336; G06F 17/30348; G06F 17/30327; G06F 17/30008; G06F 17/30339; G06F 17/30088; G06F 17/30356; G06F 17/30362; G06F 17/30371; G06F 17/30321; G06F 17/30351; G06F 17/30873; G06F 17/30162; G06F 17/30185; G06F 17/30312; G06F 17/30581; G06F 17/30949; G06F 17/30958; G06F 17/30011; G06F 17/30171; G06F 17/30359; G06F 17/30592; G06F 3/0619; G06F 16/2322; G06F 16/2336; G06F 16/2379; G06F 16/1774; G06F 16/2329; G06F 16/2228; G06F 16/22; G06F 16/2308

USPC ................ 707/703, 607, E17.005, 705, 790, 707/E17.007, E17.044, 600, 648, 649, 707/694, 695, 696, 718, 781, 797, 814, 707/999.008, 999.1, 741, 802, E17.083, 707/E17.111, E17.123, E17.127, 622, (Continued)

(56) References Cited

U.S. PATENT DOCUMENTS 5,222,235 A    6/1993    Hintz et al.
5,280,612 A    1/1994    Lorie et al.
(Continued)

OTHER PUBLICATIONS

"NBit Dictionary Compression," Sybase, May 23, 2013. Web. Mar. 15, 2017 <http://infocenter.sybase.com/help/index.jsp?topic=/com.sybase.infocenter.dc1777.1600/doc/html/wil1345808527844.html>.
(Continued)

*Primary Examiner* — Alford W Kindred
*Assistant Examiner* — Cecile H Vo
(74) *Attorney, Agent, or Firm* — Mintz Levin Cohn Ferris Glovsky and Popeo, P.C.

(57) ABSTRACT

An operation on a row of a table of a database is initiated. Thereafter, a multi-version concurrency control (MVCC) object is accessed to identify blocks associated with the row position of the row using bitwise operations. Subsequently, a row state block computed based on the row position of the row is accessed to determine a row state for the row. At least one other block is accessed, based in part on the row state, to obtain at least one timestamp from the computed offset based on the row. Next, the at least one timestamp is stored or retrieved. Related apparatus, systems, techniques and articles are also described.

18 Claims, 15 Drawing Sheets

(58) Field of Classification Search
USPC .......... 707/638, 755, 812, 999.001, 999.102, 707/999.2, 999.003, E17.014, 704, 803, 707/E17.002, 673, 689, 715
See application file for complete search history.

(56) References Cited

U.S. PATENT DOCUMENTS

| | | |
|---|---|---|
| 5,594,898 A | 1/1997 | Dalal et al. |
| 5,701,480 A | 12/1997 | Raz |
| 5,717,919 A | 2/1998 | Kodavalla et al. |
| 5,758,145 A | 5/1998 | Bhargava et al. |
| 5,794,229 A | 8/1998 | French et al. |
| 5,870,758 A | 2/1999 | Bamford et al. |
| 5,933,833 A | 8/1999 | Musashi |
| 6,070,165 A | 5/2000 | Whitmore |
| 6,275,830 B1 | 8/2001 | Muthukkaruppan et al. |
| 6,282,605 B1 | 8/2001 | Moore |
| 6,397,227 B1 | 5/2002 | Klein et al. |
| 6,453,313 B1 | 9/2002 | Klein et al. |
| 6,490,670 B1 | 12/2002 | Collins et al. |
| 6,567,407 B1 | 5/2003 | Mizukoshi |
| 6,606,617 B1 | 8/2003 | Bonner et al. |
| 6,668,263 B1 | 12/2003 | Cranston et al. |
| 6,754,653 B2 | 6/2004 | Bonner et al. |
| 6,865,577 B1 | 3/2005 | Sereda |
| 7,698,712 B2 | 4/2010 | Schreter |
| 7,761,434 B2* | 7/2010 | Surtani ............... G06F 16/2329 707/704 |
| 8,024,296 B1 | 9/2011 | Gopinathan et al. |
| 8,161,024 B2 | 4/2012 | Renkes et al. |
| 8,170,981 B1 | 5/2012 | Tewksbary |
| 8,224,860 B2* | 7/2012 | Starkey ................ G06F 16/27 707/792 |
| 8,364,648 B1 | 1/2013 | Sim-Tang |
| 8,510,344 B1 | 8/2013 | Briggs et al. |
| 8,650,583 B2 | 2/2014 | Schreter |
| 8,732,139 B2 | 5/2014 | Schreter |
| 8,768,891 B2 | 7/2014 | Schreter |
| 8,868,506 B1 | 10/2014 | Bhargava et al. |
| 9,058,268 B1 | 6/2015 | Ostiguy et al. |
| 9,098,522 B2 | 8/2015 | Lee et al. |
| 9,141,435 B2 | 9/2015 | Wein |
| 9,262,330 B2 | 2/2016 | Muthukumarasamy |
| 9,268,810 B2 | 2/2016 | Andrei et al. |
| 9,275,095 B2 | 3/2016 | Bhattacharjee et al. |
| 9,275,097 B2 | 3/2016 | DeLaFranier et al. |
| 9,305,046 B2 | 4/2016 | Bhattacharjee et al. |
| 9,372,743 B1 | 6/2016 | Sethi et al. |
| 9,430,274 B2* | 8/2016 | Zhang ................ G06F 16/2322 |
| 9,489,409 B2 | 11/2016 | Sharique et al. |
| 9,645,844 B2* | 5/2017 | Zhang ................ G06F 16/2322 |
| 9,665,609 B2* | 5/2017 | Andrei ............... G06F 16/2308 |
| 9,811,577 B2 | 11/2017 | Martin et al. |
| 2001/0051944 A1 | 12/2001 | Lim et al. |
| 2002/0107837 A1 | 8/2002 | Osborne et al. |
| 2002/0156798 A1 | 10/2002 | Larue et al. |
| 2003/0028551 A1 | 2/2003 | Sutherland |
| 2003/0065652 A1 | 4/2003 | Spacey |
| 2003/0204534 A1 | 10/2003 | Hopeman et al. |
| 2003/0217075 A1 | 11/2003 | Nakano et al. |
| 2004/0034616 A1 | 2/2004 | Witkowski et al. |
| 2004/0054644 A1 | 3/2004 | Ganesh et al. |
| 2004/0064601 A1 | 4/2004 | Swanberg |
| 2004/0249838 A1 | 12/2004 | Hinshaw et al. |
| 2005/0027692 A1 | 2/2005 | Shyam et al. |
| 2005/0097266 A1 | 5/2005 | Factor et al. |
| 2005/0234868 A1 | 10/2005 | Terek et al. |
| 2006/0004833 A1 | 1/2006 | Trivedi et al. |
| 2006/0005191 A1 | 1/2006 | Boehm |
| 2006/0036655 A1 | 2/2006 | Lastovica |
| 2006/0206489 A1 | 9/2006 | Finnie et al. |
| 2007/0192360 A1 | 8/2007 | Prahlad et al. |
| 2008/0046444 A1 | 2/2008 | Fachan et al. |
| 2008/0183958 A1 | 7/2008 | Cheriton |
| 2008/0247729 A1 | 10/2008 | Park |
| 2009/0064160 A1 | 3/2009 | Larson et al. |
| 2009/0080523 A1 | 3/2009 | McDowell |
| 2009/0094236 A1 | 4/2009 | Renkes et al. |
| 2009/0254532 A1 | 10/2009 | Yang et al. |
| 2009/0287703 A1 | 11/2009 | Furuya |
| 2009/0287737 A1 | 11/2009 | Hammerly |
| 2010/0082545 A1 | 4/2010 | Bhattacharjee et al. |
| 2010/0088309 A1 | 4/2010 | Petculescu et al. |
| 2010/0241812 A1 | 9/2010 | Bekoou |
| 2010/0281005 A1 | 11/2010 | Carlin et al. |
| 2010/0287143 A1 | 11/2010 | Di Carlo et al. |
| 2011/0010330 A1 | 1/2011 | McCline et al. |
| 2011/0060726 A1 | 3/2011 | Idicula et al. |
| 2011/0087854 A1 | 4/2011 | Rushworth et al. |
| 2011/0145835 A1 | 6/2011 | Rodrigues et al. |
| 2011/0153566 A1 | 6/2011 | Larson et al. |
| 2011/0252000 A1 | 10/2011 | Diaconu et al. |
| 2011/0270809 A1 | 11/2011 | Dinkar et al. |
| 2011/0276744 A1 | 11/2011 | Sengupta et al. |
| 2011/0302143 A1 | 12/2011 | Lomet |
| 2012/0011106 A1 | 1/2012 | Reid et al. |
| 2012/0047126 A1 | 2/2012 | Branscome et al. |
| 2012/0102006 A1 | 4/2012 | Larson et al. |
| 2012/0137081 A1 | 5/2012 | Shea |
| 2012/0179877 A1 | 7/2012 | Shriraman et al. |
| 2012/0191696 A1 | 7/2012 | Renkes et al. |
| 2012/0221528 A1 | 8/2012 | Renkes et al. |
| 2012/0233438 A1 | 9/2012 | Bak et al. |
| 2012/0265728 A1 | 10/2012 | Plattner et al. |
| 2012/0284228 A1 | 11/2012 | Ghosh et al. |
| 2013/0054936 A1 | 2/2013 | Davis |
| 2013/0060742 A1* | 3/2013 | Chang ................ G06F 16/2322 707/704 |
| 2013/0091162 A1 | 4/2013 | Lewak |
| 2013/0097135 A1 | 4/2013 | Goldberg |
| 2013/0103655 A1 | 4/2013 | Fanghaenel et al. |
| 2013/0117247 A1 | 5/2013 | Schreter et al. |
| 2013/0166566 A1 | 6/2013 | Lemke et al. |
| 2013/0346378 A1 | 12/2013 | Tsirogiannis et al. |
| 2014/0025651 A1 | 1/2014 | Schreter |
| 2014/0101093 A1 | 4/2014 | Lanphear et al. |
| 2014/0136571 A1* | 5/2014 | Bonvin ............... G06F 16/2219 707/792 |
| 2014/0214334 A1 | 7/2014 | Plattner et al. |
| 2014/0222418 A1 | 8/2014 | Richtarsky et al. |
| 2014/0279930 A1 | 9/2014 | Gupta et al. |
| 2014/0279961 A1 | 9/2014 | Schreter et al. |
| 2015/0039573 A1 | 2/2015 | Bhattacharjee et al. |
| 2015/0089125 A1 | 3/2015 | Mukherjee et al. |
| 2015/0106382 A1 | 4/2015 | Liu et al. |
| 2015/0113026 A1 | 4/2015 | Sharique et al. |
| 2015/0142819 A1 | 5/2015 | Florendo et al. |
| 2015/0193264 A1* | 7/2015 | Hutton .................. G06F 9/54 719/328 |
| 2015/0261805 A1* | 9/2015 | Lee .................... G06F 16/2322 707/703 |
| 2015/0278281 A1* | 10/2015 | Zhang ................ G06F 16/2322 707/703 |
| 2016/0103860 A1 | 4/2016 | Bhattacharjee et al. |
| 2016/0110403 A1* | 4/2016 | Lomet ................ G06F 16/2329 707/695 |
| 2016/0125022 A1 | 5/2016 | Rider et al. |
| 2016/0147445 A1 | 5/2016 | Schreter et al. |
| 2016/0147447 A1 | 5/2016 | Blanco et al. |
| 2016/0147448 A1 | 5/2016 | Schreter et al. |
| 2016/0147449 A1 | 5/2016 | Andrei et al. |
| 2016/0147457 A1 | 5/2016 | Legler et al. |
| 2016/0147459 A1 | 5/2016 | Wein et al. |
| 2016/0147617 A1 | 5/2016 | Lee et al. |
| 2016/0147618 A1 | 5/2016 | Lee et al. |
| 2016/0147750 A1 | 5/2016 | Blanco et al. |
| 2016/0147776 A1 | 5/2016 | Florendo et al. |
| 2016/0147778 A1 | 5/2016 | Schreter et al. |
| 2016/0147786 A1 | 5/2016 | Andrei et al. |
| 2016/0147801 A1 | 5/2016 | Wein et al. |
| 2016/0147804 A1 | 5/2016 | Wein et al. |
| 2016/0147806 A1 | 5/2016 | Blanco et al. |
| 2016/0147808 A1 | 5/2016 | Schreter et al. |
| 2016/0147809 A1 | 5/2016 | Schreter et al. |

(56) References Cited

U.S. PATENT DOCUMENTS

| | | |
|---|---|---|
| 2016/0147811 A1 | 5/2016 | Eluri et al. |
| 2016/0147812 A1 | 5/2016 | Andrei et al. |
| 2016/0147813 A1 | 5/2016 | Lee et al. |
| 2016/0147814 A1 | 5/2016 | Goel et al. |
| 2016/0147819 A1 | 5/2016 | Schreter et al. |
| 2016/0147820 A1 | 5/2016 | Schreter |
| 2016/0147821 A1 | 5/2016 | Schreter et al. |
| 2016/0147834 A1 | 5/2016 | Lee et al. |
| 2016/0147858 A1 | 5/2016 | Lee et al. |
| 2016/0147859 A1 | 5/2016 | Lee et al. |
| 2016/0147861 A1 | 5/2016 | Schreter et al. |
| 2016/0147862 A1 | 5/2016 | Schreter et al. |
| 2016/0147904 A1 | 5/2016 | Wein et al. |
| 2016/0147906 A1 | 5/2016 | Schreter et al. |

OTHER PUBLICATIONS

"HANA database lectures—Outline Part 1 Motivation—Why main memory processing." Mar. 2014 (Mar. 2014). XP055197666. Web. Jun. 23, 2015.; URL:http://cse.yeditepe.edu.tr/-odemir/spring2014/cse415/HanaDatabase.pdf.

"HANA Persistence: Shadow Pages." Jun. 2013. *Yeditepe Üniversitesi Bilgisayar Mühendisliği Bölümü*. Web. Apr. 21, 2016. <http://cse.yeditepe.edu.tr/~odemir/spring2014/cse415/Persistency.pptx>.

"Optimistic concurrency control." Wikipedia: The Free Encyclopedia. Wikimedia Foundation, Inc., Jul. 19, 2014. Web. Mar. 3, 2016.

Brown, E. et al. "Fast Incremental Indexing for Full-Text Information Retrieval." *VLCB '94 Proceedings of the 20th International Conference on Very Large Data Bases*. San Francisco: Morgan Kaufmann, 1994.

Jens Krueger et al. "Main Memory Databases for Enterprise Applications." Industrial Engineering and Engineering Management (IE &EM), 2011 IEEE 18th International Conference on, IEEE, Sep. 3, 2011 (Sep. 3, 2011), pp. 547-557, XP032056073.

Lemke, Christian, et al. "Speeding Up Queries in Column Stores." *Data Warehousing and Knowledge Discovery Lecture Notes in Computer Science* (2010): 117-29. Web. Apr. 21, 2016.

Lu, Andy. "SAP HANA Concurrency Control." *SAP Community Network*. Oct. 28, 2014. Web. Apr. 22, 2016. <http://scn.sap.com/docs/DOC-57101>.

Mumy, Mark. "SAP Sybase IQ 16.0 Hardware Sizing Guide." *SAP Community Network*. May 12, 2013. Web. Apr. 21, 2016. <http://www.sdn.sap.com/irj/scn/go/portal/prtroot/docs/library/uuid/c0836b4f-429d-3010-a686-c35c73674180?QuickLink=index&overridelayout=true&58385785468058>.

Ailamaki, et al., "Weaving Relations for Cache Performance," Proceedings of the the Twenty-Seventh International Conference on Very Large Data Bases, Sep. 11-14, Orlando, FL, Jan. 1, 2001.

Hector Garcia-Molina, et al., "Database Systems the Second Complete Book Second Edition—Chapter 13—Secondary Storage Management," *Database Systems the Complete Book*, second edition, Jun. 15, 2008.

\* cited by examiner

US 10,552,402 B2

DATABASE LOCKLESS INDEX FOR ACCESSING MULTI-VERSION CONCURRENCY CONTROL DATA

TECHNICAL FIELD

The subject matter described herein relates an in-memory database system having a lockless index for multi-version concurrency control data (i.e. the meta data stored along with the actual columns data for determining the visibility of the row used along with the read snapshot timestamp).

BACKGROUND

In-memory databases are database management systems in which data is primarily stored transiently; namely in main memory. In order to obtain optimum performance, as much data as possible must be kept in memory. However, given the large number of concurrent transactions, multi-version concurrency control (MVCC) mechanisms are adopted to provide point in time consistent views on the underlying data.

SUMMARY

In one aspect, an operation on a row of a table of a database is initiated. Thereafter, a multi-version concurrency control (MVCC) object is accessed to identify blocks associated with the row position of the row using bitwise operations. Subsequently, a row state block computed based on the row position of the row is accessed to determine a row state for the row. At least one other block is accessed, based in part on the row state, to obtain at least one timestamp from the computed offset based on the row. Next, the at least one timestamp is stored or retrieved.

A versioned vector can be accessed at a slot computed using bit shift operations based on the row position of the row to obtain a block handle. The block handle includes a pointer to the block and a handle to a page associated with the block. An offset in the block can be determined that is relative to the pointer to the starting of the block information using bitwise and operations of the row associated with the row position.

The block handle can be registered in an index structure comprising a plurality of block handles. There can be two threads attempting to insert a block handle in the index structure such that a first thread inserts the block handle in the index structure using an atomic operation and the other thread will use the registered value by destroying its own allocated block.

The page can be persisted. The operation can include inserting data, deleting data, or reading data. The block can include a row state vector encapsulating the determined row state. The at least one timestamp can be a temporary timestamp or commit timestamp associated with the transaction that inserted or deleted the row. Depending on the determined row state, at least one of a commit timestamp vector or a delete timestamp vector can be accessed to obtain at least one corresponding timestamp.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many technical advantages. For example, the current subject matter is advantageous in that it is applicable to both OLTP and OLAP without compromising response time while, at the same time, providing lockless and efficient access to MVCC information (timestamp or row state values). At the same time, the current subject matter is advantageous in that it requires a smaller memory footprint as compared to conventional techniques.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter includes a number of aspects that can be applied individually or in combinations of one or more such aspects to support a unified database table approach that integrates the performance advantages of in-memory database approaches with the reduced storage costs of on-disk database approaches. The current subject matter can be implemented in database systems using in-memory OLAP, for example including databases sized at several terabytes (or more), tables with billions (or more) of rows, and the like; systems using in-memory OLTP (e.g. enterprise resource planning or ERP system or the like), for example in databases sized at several terabytes (or more) with high transactional volumes; and systems using on-disk OLAP (e.g. "big data," analytics servers for advanced analytics, data warehousing, business intelligence environments, or the like), for example databases sized at several petabytes or even more, tables with up to trillions of rows, and the like.

Figure 1:
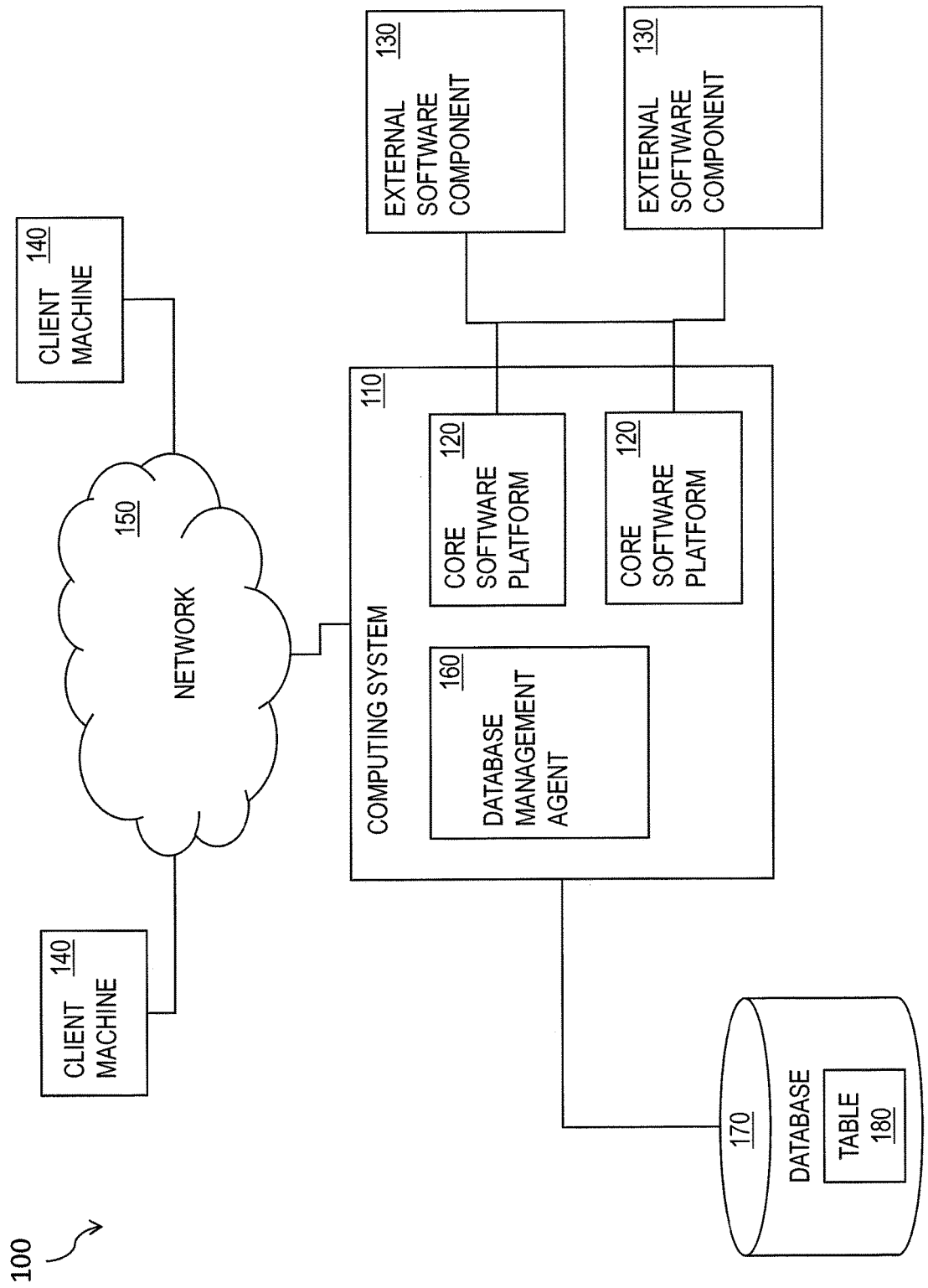
FIG. 1 is a diagram illustrating features of a business software system architecture.

The current subject matter can be implemented as a core software platform of an enterprise resource planning (ERP) system, other business software architecture, or other data-intensive computing application or software architecture that runs on one or more processors that are under the control of a specific organization. This arrangement can be very effective for a large-scale organization that has very sophisticated in-house information technology (IT) staff and for whom a sizable capital investment in computing hardware and consulting services required to customize a commercially available business software solution to work with organization-specific business processes and functions is feasible. FIG. 1 shows a diagram 100 of a system consistent with such an implementation. A computing system 110 can include one or more core software platform modules 120 providing one or more features of the business software system. The computing system can also aggregate or otherwise provide a gateway via which users can access functionality provided by one or more external software components 130. Client machines 140 can access the computing system, either via a direct connection, a local terminal, or over a network 150 (e.g. a local area network, a wide area network, a wireless network, the Internet, or the like).

A database management agent 160 or other comparable functionality can access a database management system 170 that stores and provides access to data (e.g. definitions of business scenarios, business processes, and one or more business configurations as well as data, metadata, master data, etc. relating to definitions of the business scenarios, business processes, and one or more business configurations, and/or concrete instances of data objects and/or business objects that are relevant to a specific instance of a business scenario or a business process, and the like. The database management system 170 can include at least one table 180 and additionally include parallelization features consistent with those described herein.

Figure 2:
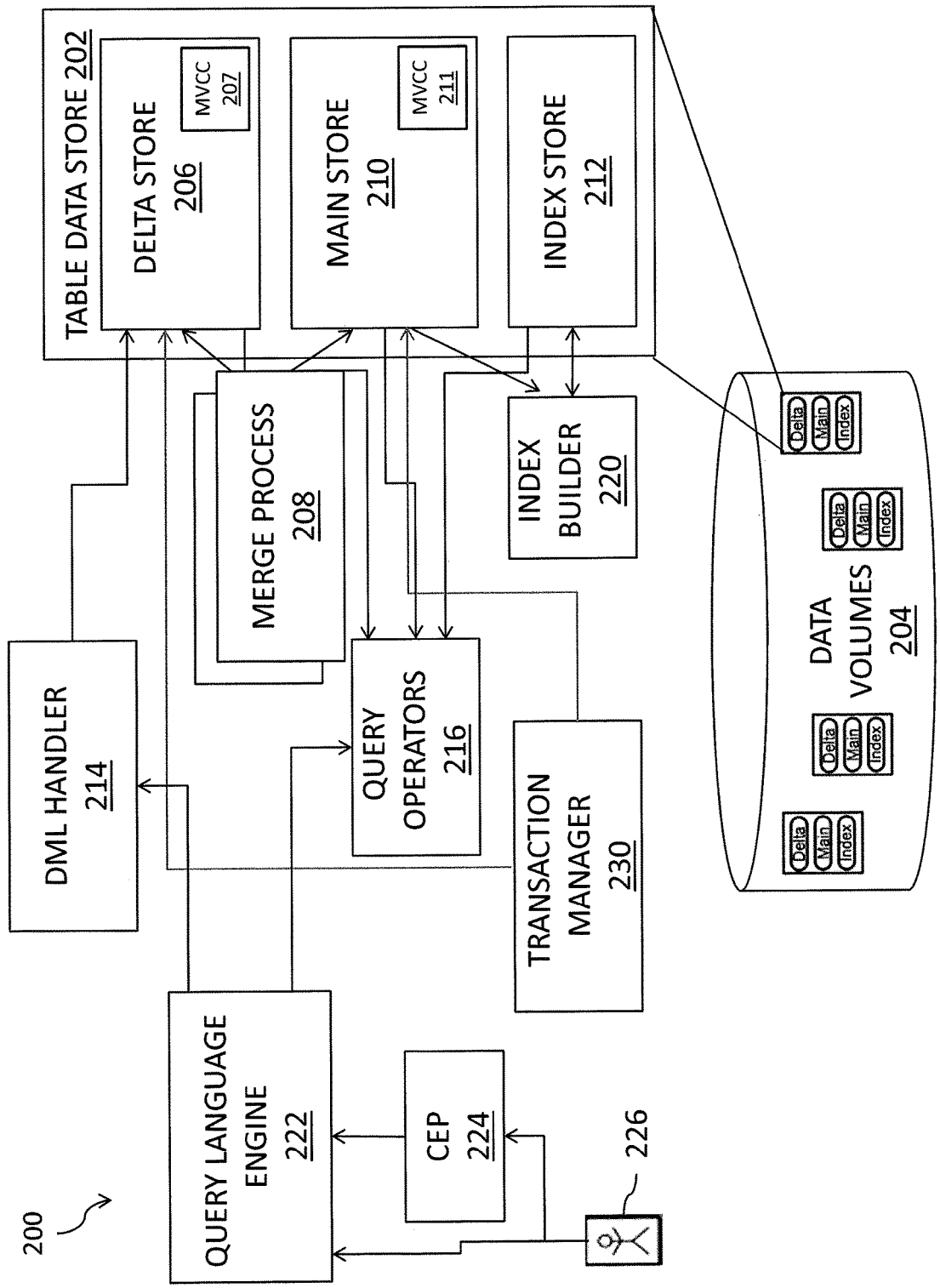
FIG. 2 is another diagram illustrating features of a business software system architecture.

FIG. 2 shows a block diagram of an architecture 200 illustrating features that can be included in a database or database management system consistent with implementations of the current subject matter. A table data store 202, which can be retained among a plurality of data volumes 204, can include one or more of a delta store 206 (e.g. a paged delta part, which can optionally be OLTP optimized and can optionally include a merge process 208), an index store 212 (e.g. one or more segmented indices), and a main store 210. The main store 210 can include a main part that is fragmented consistent with features described herein. The delta store 206 can include an MVCC store 207 that stores MVCC data for rows within such delta store 206 and, similarly, the main store 210 can include an MVCC store 211 that stores MVCC data for rows within such main store 210 (sometimes also referred to as row visibility information such as in FIG. 7).

Figure 3:
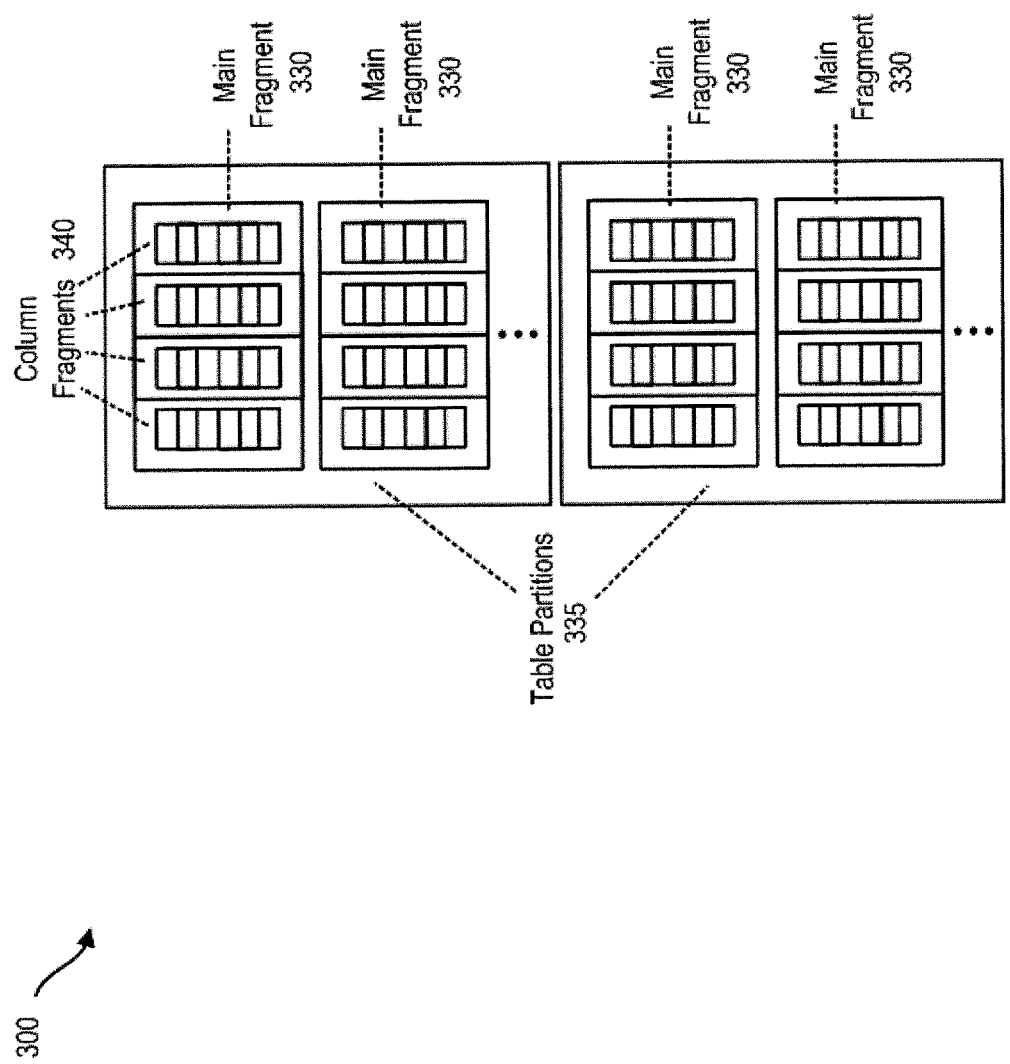
FIG. 3 is a schematic representation of fragments stored in a main store.

To achieve a best possible compression and also to support very large data tables, a main part of the table can be divided into one or more fragments. FIG. 3 shows a schematic representation 300 of the various fragments stored in main store 210. One or more main fragments or fragments 330 can be used for each table or column of a database. Small, manageable tables can be represented with a single fragment. Very large tables can be split into two or more table partitions 335. Each table partition may, in turn, include two or more fragments 330. Fragments 330 can be horizontal slices of the table to which they belong. Each fragment 330 can include one or more column fragments 340. Each column fragment 340 can have its own dictionary and value ID array consistent with the features described herein.

Fragments 330 can advantageously be sufficiently large to gain maximum performance due to optimized compression of the fragment and high in-memory performance of aggregations and scans. Conversely, such fragments can be sufficiently small to load a largest column of any given fragment into memory and to sort the fragment in-memory. Fragments can also be sufficiently small to be able to coalesce two or more partially empty fragments into a smaller number of fragments. As an illustrative and non-limiting example of this aspect, a fragment can contain one billion rows with a maximum of 100 GB of data per column. Other fragment sizes are also within the scope of the current subject matter. A fragment can optionally include a chain of pages. In some implementations, a column can also include a chain of pages. Column data can be compressed, for example using a dictionary and/or any other compression method. Table fragments can be materialized in-memory in contiguous address spaces for maximum performance. All fragments of the database can be stored on-disk, and access to these fragments can be made based on an analysis of the data access requirement of a query. Each fragment will have its own set of MVCC pages which are hosting the MVCC blocks that stores the (row state or timestamp information) metadata used for determining visibility of the rows. MVCC data is the metadata stored along with the actual columns data for determining the visibility of the row used along with the read snapshot timestamp. A transaction manger 230 can be coupled to the main store 210 (and the corresponding MVCC store 211) as well as the delta store 206 (and the corresponding MVCC store 207) to provide snapshot timestamps for read operations along with MVCC data (which in turn provides visibility data for the corresponding row).

Referring again to FIG. 2, other parts of the architecture 200 can include a data manipulation language (DML) handling module or similar functionality 214, one or more query handling modules or similar functionality 216 (e.g. including multi-version concurrency control), an index builder 220 that supports the index store 212, a query language engine 222 (which can, for example, be a SQL engine), a complex events processing module (e.g. an event handler, a stream processing module, etc.) 224 for receiving inputs from a user 226, and the like.

Figure 4:
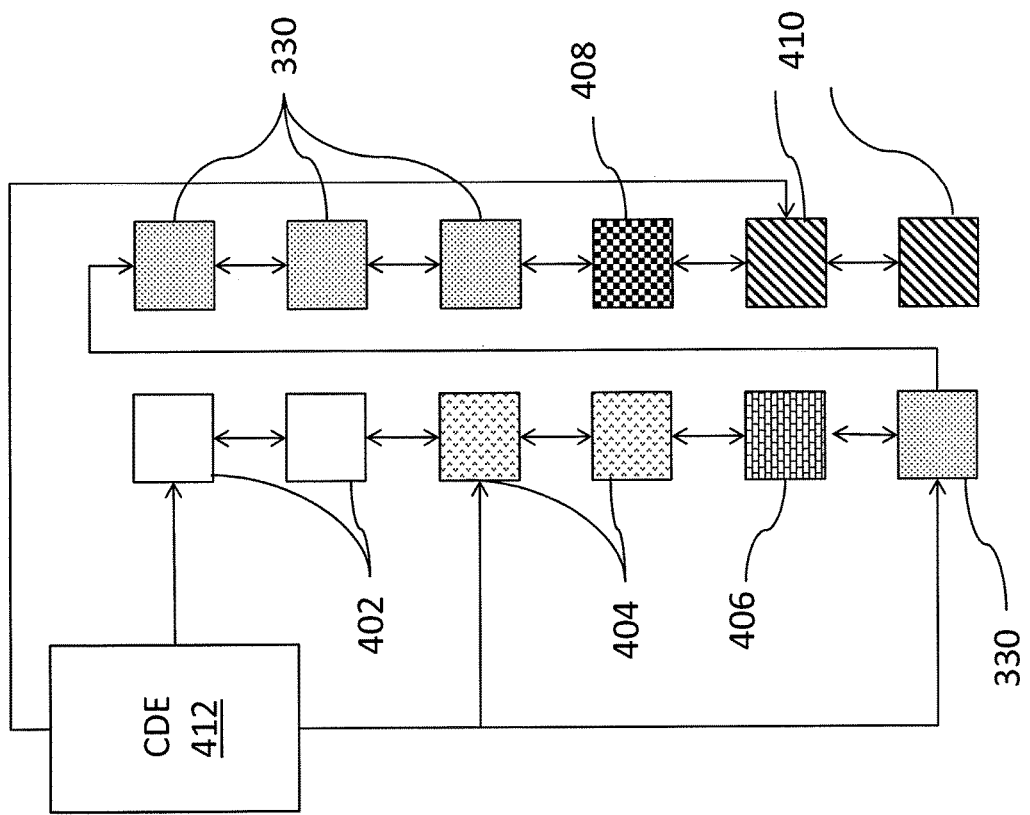
FIG. 4 is a diagram illustrating features of a unified table container page chain.

FIG. 4 shows a block diagram illustrating an example of a unified table container page chain 400. As described above, each fragment can optionally include a chain of pages. In general, a container can be represented as a page chain. A page chain can generally be characterized as a set of pages that are linked in a given order. The term pages, as used herein, refers to a basic unit of storage in a database. A page size is generally established when the database is built and typically cannot be changed. A representative page size can be on the order of 2 kB, 4 kB, 8 kB, 16 kB, or the like.

Once the server is built, the value usually cannot be changed. Different types of pages can store different types of database objects. For example, data pages can store data rows or columns for a table. Index pages can store index rows for one or more levels of an index. Large object (LOB) pages can store data for text and image columns, for Java off-row columns, and the like.

Also as shown in FIG. 4, sub-chains of the page chain can be defined for a delta part, a main part, dictionaries, MVCC data, index segments (optionally, not shown in FIG. 2), and the like such that a "whole" of each of these entities contains one or more pages. In some implementations of the current subject matter, a delta part can include both "hot" delta fragments 402 and "cold" delta fragments 404, which can be stored separately. In addition, the delta part can also include an MVCC sub-chain 406 for MVCC data. The main part can also be subdivided into main fragments 330 and can include an MVCC sub-chain 408. Pages containing dictionary-compressed columnar data 410 can refer to pages containing dictionaries for them. Individual table parts can be loaded into main memory on-demand. A merge process can be decoupled from transaction handling such that a merge process can be executed at recovery time (e.g. during log replay). A page chain, such as the example shown in FIG. 4, can be initiated by a container directory entry (CDE) 412.

A single RowID space can be used across pages in a page chain. A RowID, which generally refers to a logical row in the database, can be used to refer to a logical row in an in-memory portion of the database and also to a physical row in an on-disk portion of the database. A row index typically refers to physical 0-based index of rows in the table. A 0-based index can be used to physically address rows in a contiguous array, where logical RowIDs represent logical order, not physical location of the rows. In some in-memory database systems, a physical identifier for a data record position can be referred to as a UDIV or DocID or RowPos. Distinct from a logical RowID, the UDIV or DocID or RowPos (or a comparable parameter) can indicate a physical position of a row (e.g. a data record), whereas the RowID indicates a logical position. To allow a partition of a table to have a single RowID and row index space consistent with implementations of the current subject matter, a RowID can be assigned a monotonically increasing ID for newly-inserted records and for new versions of updated records across fragments. In other words, updating a record will change its RowID, for example, because an update is effectively a deletion of an old record (having a RowID) and insertion of a new record (having a new RowID). Using this approach, a delta store of a table can be sorted by RowID, which can be used for optimizations of access paths. Separate physical table entities can be stored per partition, and these separate physical table entities can be joined on a query level into a logical table.

When an optimized compression is performed during a columnar merge operation to add changes recorded in the delta store to the main store, the rows in the table are generally re-sorted. In other words, the rows after a merge operation are typically no longer ordered by their physical row ID. Therefore, stable row identifier can be used consistent with one or more implementations of the current subject matter. The stable row identifiers can optionally be a logical RowID. Use of a stable, logical (as opposed to physical) RowID can allow rows to be addressed in REDO/UNDO entries in a write-ahead log and transaction undo log. Additionally, cursors that are stable across merges without holding references to the old main version of the database can be facilitated in this manner. To enable these features, a mapping of an in-memory logical RowID to a physical row index and vice versa can be stored. In some implementations of the current subject matter, a RowID column can be added to each table. The RowID column can also be amenable to being compressed in some implementations of the current subject matter.

Figure 5:
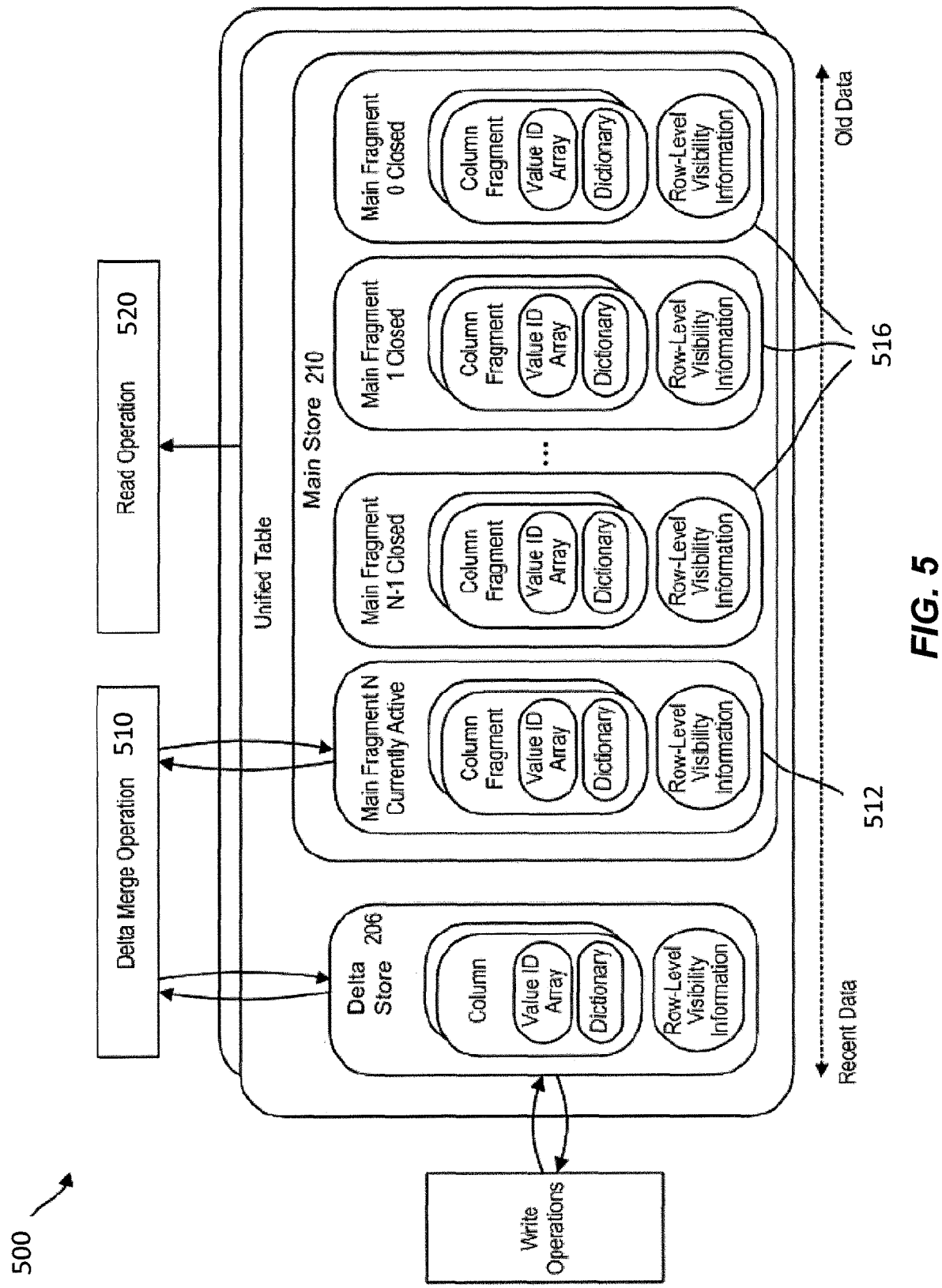
FIG. 5 is a functional block diagram illustrating performing a delta merge operation and a read operation using a unified table.

FIG. 5 shows a functional block diagram 500 for performing a delta merge operation 510 on a unified table. New transactions or changes can initially be written into delta store 206. Main store 510 can include one active fragment 512 and one or more closed fragments 516. When updates are merged from delta store 206 into the main store 210, existing records in the closed fragments 516 cannot be changed. Instead, new versions of the records can be added to the active fragment 512, and old versions can be marked as invalid.

Functional block diagram 500 also illustrates a read operation 520. Generally, read operations can have access to all fragments (i.e., active fragment 512 and closed fragments 516). Read operations can be optimized by loading only the fragments that contain data from a particular query. Fragments that do not contain such data can be excluded. In order to make this decision, container-level metadata (e.g., a minimum value and/or a maximum value) can be stored for each fragment. This metadata can be compared to the query to determine whether a fragment contains the requested data.

Figure 6:
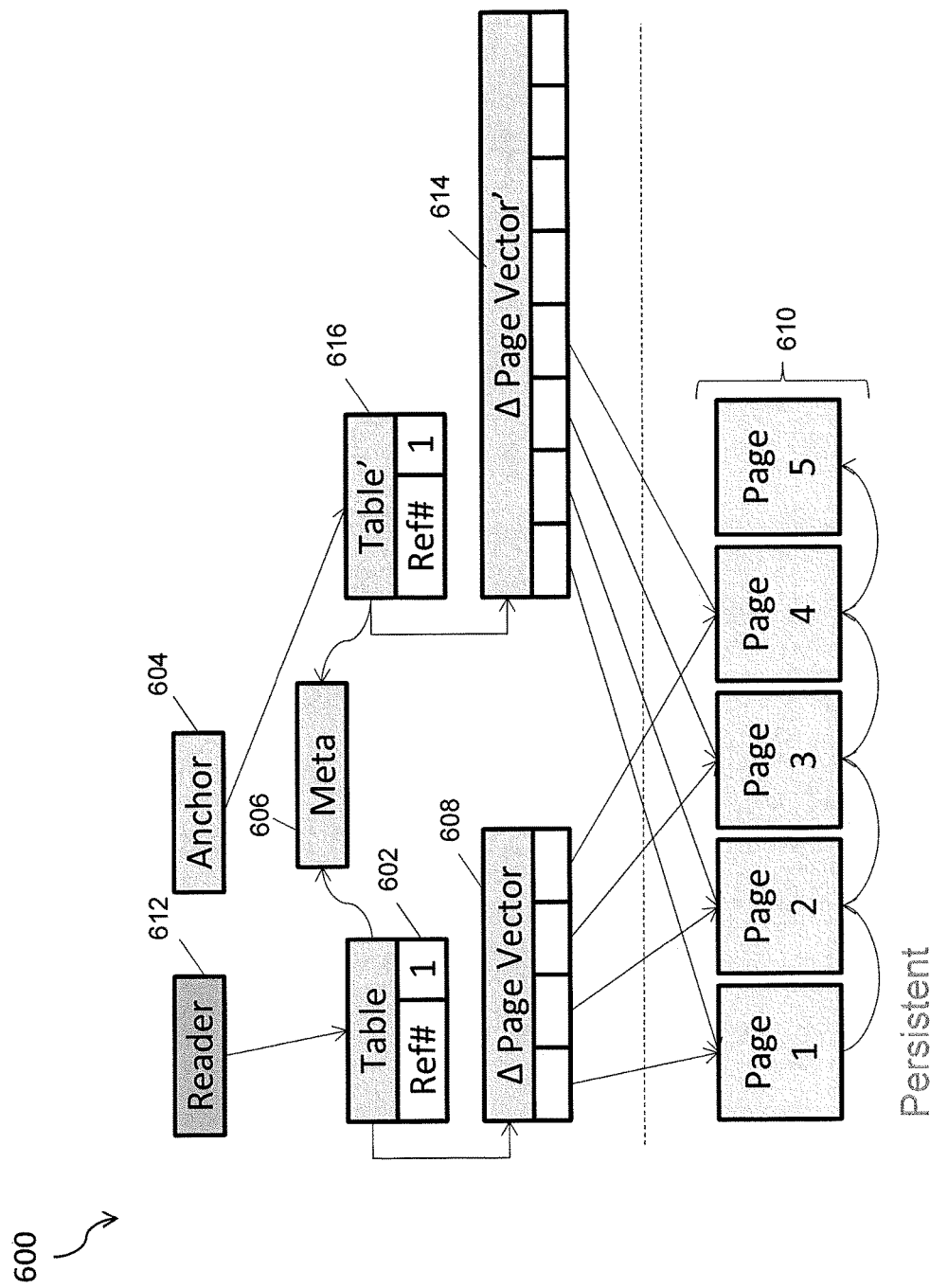
FIG. 6 is a diagram illustrating a unified table container.

FIG. 6 is a diagram 600 illustrating a unified table container which includes a transient portion (i.e., data loaded into memory) and persistent portion in which a plurality of pages are stored in physical storage (i.e., the pages are persisted). The objects can represent a table in memory and can be organized in a tree, which can be rooted at table header object 602 and pointed to by an anchor pointer 604. The anchor pointer 604 can be used to point to the root object of the table. The table header object, like all versioned objects, can have a reference count. The metadata 606 can characterize various aspects about the table represented by header object 602 (i.e., to define table columns and their data types, constraints, etc.). The table can link to a page vector object 608 that in turn links (via page handles) to a plurality of pages $610_1 \ldots _n$ (in this example it is linked to a first page $610_1$ and a second page $610_2$) of an in-memory table loaded in memory (from physical persistent storage). Page handles pin the loaded pages in memory. A modification to the internal structure can be synchronized against concurrent access by some means such as a mutex lock.

Referring again to FIG. 6, for each corresponding read operation of an object graph by a reader 612, a reference count of the root object (e.g., table 602) can be incremented (with the reference count 1 for the root object initially reflecting a single anchor pointer 604 pointing to the root object 602). Subsequently, one or more of the objects are changed. Incompatible changes result in the root object 602, at least one changed object, and any intervening objects within the hierarchy of objects being cloned (e.g., table 616). The anchor pointer 606 can then link to the cloned root object (table 616). The root object 602 can be later dropped when the reference count for the root object is zero. In addition, the object graph is traversed starting at the root object 602 and ending at the at least one changed object removing any edges for such objects. Each object having a reference count of zero is then dropped. Further details about unified table containers including a full sequence relating to a read operation can be found in U.S. Pat. App. Pub. No. 20140025651 entitled: "Lock-Free, Scalable Read Access to Shared Data Structures", the contents of which are hereby fully incorporated by reference.

Figure 7:
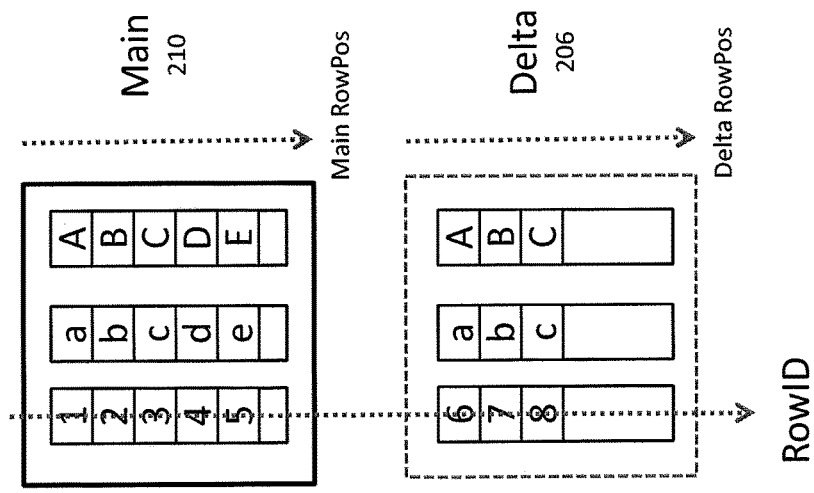
FIG. 7 is a diagram the relation between row position and row identifier.

With reference to diagram 700 of FIG. 7, as used by the database 180, the RowID is the identifier row in the table. Whether, the row is in the delta store 206 or the main store 210, the RowID remains the same but the RowID remains the same. The RowID is persisted. In contrast, the rowPOS refers to the index of the row in the column vector of delta store 206 or main store 210. rowPos is local to the container (i.e. delta2/delta/main) and will change after the delta merge operation. rowPOS can be loaded in memory. MVCC data can be maintained based on the rowPos values. Each rowPos can be mapped to a slot in the MVCC page for retrieving its associated information.

The database 170 can use version vectors that can provide lock-less read and writes in a concurrent environment. With such an arrangement, the clients can check the size of the data object associated with the versioned vector before trying to store a new data element and, if necessary, increases the size of the data object. Increasing the versioned data object can create a new version of the data object with the appropriate size requirements and which is hooked to the versioned vector header (e.g., a header referencing the data object and version, etc.). With this arrangement, any concurrent reader using a previous version of a data object will still read its own version (which is consistent). Old versions of the data object are garbage collected (i.e., the memory associated with such object is freed up by a garbage collector, etc.) after all the readers are completed with their work.

A versioned vector can also provide an append API to store the data in the vector and to ensure that any new data will be written to all the versions of the data object. For example, task T1 is appending its value to the vector having size 10 and another task T2 is also trying to append at the same slot (last element), then one of the task creates a new version of the data object. In order to make both writes as visible, versioned vectors can check the latest version of the data object after completing the write. If there is any change in the version of data object then it will copy the data to new versions.

Figure 8:
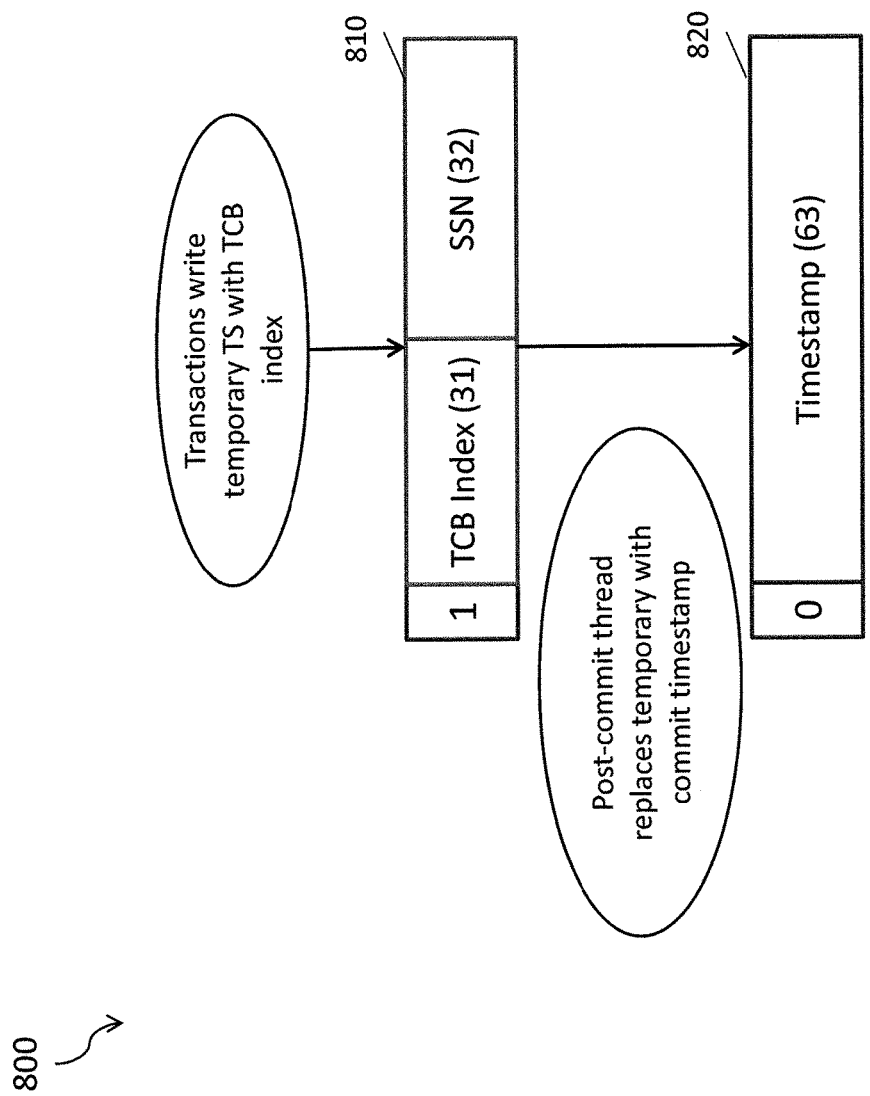
FIG. 8 is a diagram illustrating temporary and final timestamps for a row.

FIG. 8 is a diagram 800 that illustrates an MVCC timestamp. In this example the timestamp comprises a 64 bit value that can include a temporary timestamp 810 (as indicated by the initial bit) or a final timestamp 820 (as indicated by the initial bit). The temporary timestamp 810 can include a transaction control block (TCB) index which identifies the corresponding transaction as well as a statement sequence number (SSN) which can be assigned by a SQL engine. The TCB index, for example, can consume 31 bits, and the SSN can consume 32 bits. The final timestamp 820 can comprises a commit timestamp which can be obtained from a TCB. Transactions can initially write the temporary timestamp 810 with the corresponding TCB index. After the corresponding thread commits, the post-commit thread can replaces the temporary timestamp 810 with the final timestamp 820. With such an arrangement, 64 bit read and writes can be performed by atomic operations. Further, only the initial bit can be used to differentiate between the temporary timestamp and the commit timestamp.

Figure 9:
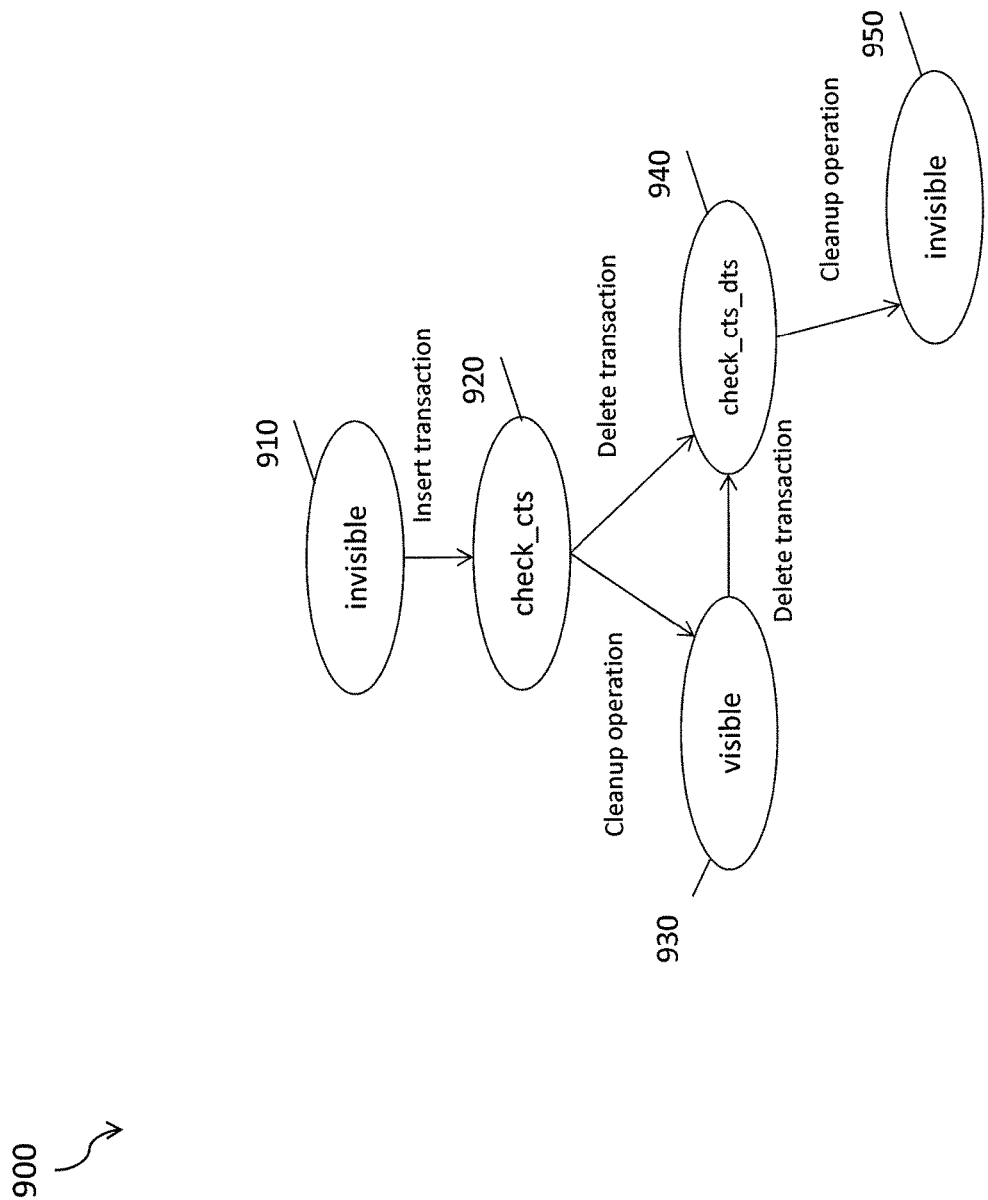
FIG. 9 is a diagram illustrating row states.

With reference to diagram 900 of FIG. 9, MVCC data can have various row states that characterize a current state of the row. This row state is in addition to time stamp such as CTS which is a commit time stamp of the transaction that inserted the row (64 bit value), and DTS which is a commit time stamp of the transaction that deleted the row (64 bit value). Row state (sometimes referred to as RowState) can be a two bit value as follows:

a. 00—INVISIBLE
    b. 01—CHECK_CTS
    c. 10—VISIBLE
    d. 11—CHECK_CTS_DTS

Referencing again FIG. 9, initially, the row, at 910, has an invisible row state prior to its use (bit value 10). Unused rows can have maximum CTS and DTS values to indicate same. Next, at 920, an insert transaction causes the row state to change to CHECK_CTS (bit value 01). If the insert transaction is then cleaned up (i.e., the transaction is qualified for cleanup operation because there are no readers/clients in the system whose visibility will not allow the changes done by the transaction, etc.), at 930, the row state changes to visible (bit value 10) which allows the corresponding row to be fully viewable. If the row is deleted (either before being cleanup or afterwards), at 940, the row state will be changed to CHECK_CTS_DTS (bit value 11) which indicates that both time stamps need to be analyzed to determine the time window in which the row is valid. Thereafter, the row delete is cleaned up whenever the minRead timestamp of the system is greater than the delete transaction commit timestamp and the row can be sent to garbage collection as part of a cleanup operation which causes, at 950, the row state to then become invisible (bit value 10). In a garbage collected row state, the CTS and the DTS values can are zero.

Each MVCC block can have a header. Such header can include a generic block header in a first portion and MVCC specific data in a second portion. The generic block header can encapsulate information such as block version, block type, and block size. The generic block header can have a common structure for MVCC data blocks as well as dictionary blocks. The MVCC specific data can encapsulate information including, for example, a starting row position (RowPos), a number of active cells, a minimum timestamp, and a flag a flag indicating the state of the MVCC block that specify that it needs special handling due to earlier partial cleanup or post-commit operation caused by resource limitation errors. The number of active cells can be tracked for garbage collection purpose. If this value becomes 0, then the block will be garbage collected (i.e., the memory associated with the block will be cleared and freed, etc.). In addition, the minimum timestamp represents the tracking of the smallest timestamp in block (not 0) which can be used by a table-level garbage collection API to skip un-necessary blocks.

MVCC data can be persisted and can be stored in MVCC Pages (which can, for example, be derived from a regular block page but with an MVCC tag) and which can, for example, have a size of 256K. MVCC data can be addressed by indexing rowPos into a block in the MVCC page. Date can then be stored in blocks. These blocks can have varying sizes. In one example, the block can be 8K plus the size of the MVCC block header. Timestamp blocks can include CTS and DTS. In one example, the timestamp blocks can holds 1K entries, 8 byte value. RowState blocks can, for example, hold 32K entries with 2 bits per row. Stub blocks can include STUB_CTS, STUB_DTS, and STUB_RESERVED and can, for example, be 32 bytes and they can act as place holders from the garbage collected range (i.e. the range of rows are fully visible/invisible).

Blocks can be used in order to perform atomic operations and store data that can be indexed using bit-wise operations. For example, 8K data can easily be addressed by shifting (10 bits for TS or 15 bits for RS) of rowPos. Further, Bit shift operations are more efficient than multiplication, division or modulo operations.

MVCC blocks can have an index structure that can map rowPos to block. Such an index structure can provide lockless read and write operations. Further, the index structure can be dynamically grown so that it can increase the size of the structure while allocating new blocks. In addition, the MVCC index structure is advantageous in that it allows for consistent reads while, at the same time, dynamically growing the structure. The index structure can use versioned vectors [Header, Versioned data object] with additional logic in APIs that can store the MVCC information.

The MVCC block can be represented by minimal information that can be stored using atomic operations. For example, the MVCC block header can be 32 bytes which cannot be stored using atomic APIs. Therefore, a structure referred to herein as a block handle (or sometimes a Block-Handle) can be stored in the versioned vector. In some cases, the block handle can be 16 bytes. As there are no instructions that support 32 byte atomic operations, the MVCC block header cannot be stored in the versioned vector used for indexing the MVCC blocks. However, the size of the BlockHandle being 16 byte and the instructions supporting the 128 bit atomic operations can be used to store the BlockHandle in the versioned vector. Hence BlockHandles (which are wrappers on MVCCBlockHeader) can be stored in the versioned vector. The block handle can include a pointer to a corresponding block and a handle to a page associated with the block. As noted above, the MVCC block can take a 16 byte structure is written using 128 bit atomic write operation (CAS) provided by intel SSE 4.2 instructions (using double word atomic operations)

The row position (rowPos) can be used to determine the location of the MVCC cell within an MVCC block. Initially, for timestamp information of rowPos X, the block index i.e. slot in the versioned vector holding the MVCC block associated with the rowPos: (X>>10) [8K=1K*8 Byte timestamp values] with an offset (i.e. this is the location of the rowPos with-in the block starting from a rowPos which is multiple of 1024) in the block: (X & 1023). The row state (rowState) information of rowPos X can be determined using block Index: (X>>15) [32K entries (2bits per row): 8K bytes] with an ffset in the block: [Y=RSWord ((X & (2^15−1))>>5)[i.e. word in the row state block holding the 2 bit rows state information of the rowPos X], RS=(Y>>((X & 31) <<1)) & 0x3) (i.e. with in the row state word holding 32 rows row state information only the 2 bits of interested to this rowPos X needs to be extracted)]. In one specific example, for row position (rowPos) 1250, the time stamp is at block index 1 with offset 226. The row state (rowState) information is block index=0, RSWord=block[39], RS=(RSWord>>((120 & 31)<<1)) &0x3).

Figure 10:
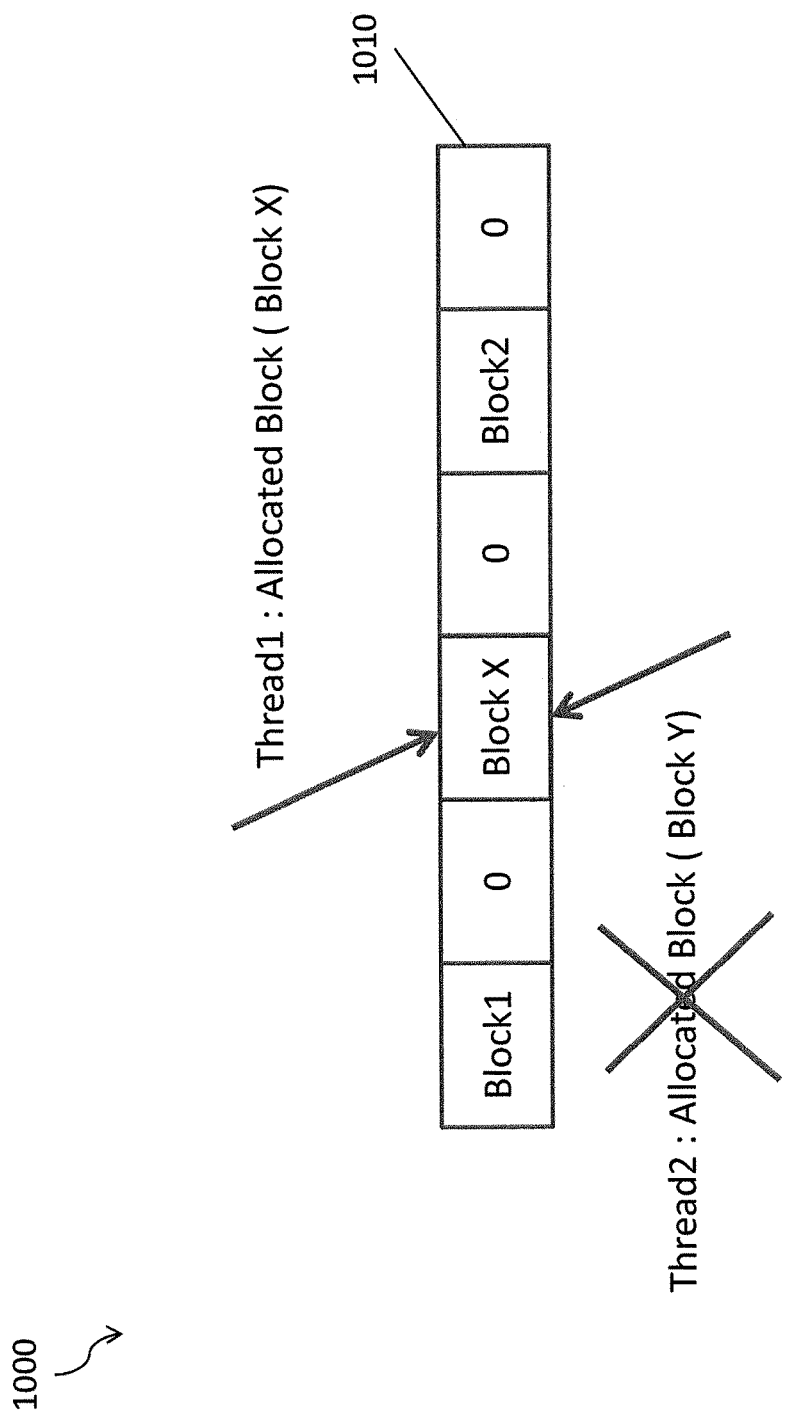
FIG. 10 is a diagram illustrating registration of an MVCC block in a block info vector.

FIG. 10 is a diagram 1000 illustrating registration of an MVCC block in a block info vector 1010 (which can also be characterized as an index structure) containing block handles. Initially, thread 1 is allocating the block for a rowPos and allocated block X. Subsequently, thread 2 also allocated a block Y for the same range of rowPos (allocated by thread 1). Once the block is allocated, both of the threads attempt to insert the block information (i.e. block handle) in the index structure (i.e. MVCC block info vector) using the atomic operation and one thread will succeed in inserting the block handle in the index structure and the other thread will use the registered block by leaving the allocated block in the free list. In this example, block Y is moved to a free block (i.e., a block handle to block Y is written to the free block) because thread 1 successfully registered its block X for the same range of row positions. Thread 2 can, however, use block X for writing data.

Figure 11:
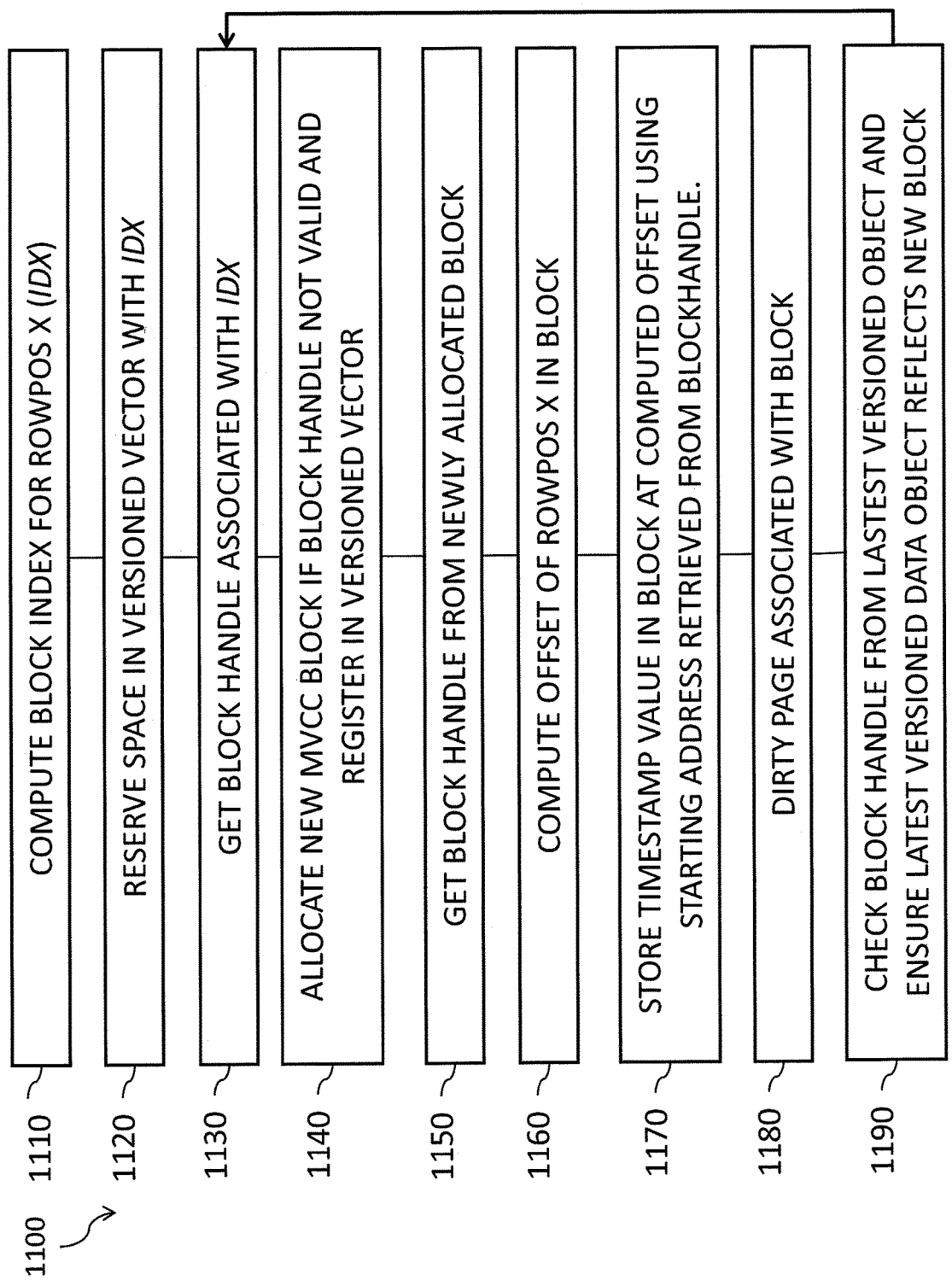
FIG. 11 is a process flow diagram illustrating writing of multi-version concurrency control data.

Diagram 1100 of FIG. 11 illustrates a process for clients that attempt (for rowPos X) to write MVCC timestamp or row-state does. Initially, at 1110, a block index can be computed for the given rowPos X (idx). Thereafter, at 1120, space in the versioned vector with idx can be reserved. If the size of the vector <idx then it is no-op, otherwise space in the version vector idx is reserved. Next, at 1130, the block handle associated with idx can be obtained from the latest version of the versioned data object. If the block handle is not valid then, at 1140, a new MVCC block (for the given type) can be allocated using efficient block allocation algorithms and the new block handle can be registered in the versioned vector used for indexing the MVCC block at slot idx. Next, at 1150, the block handle associated with idx can be obtained from the versioned vector. This can be required because there might be multiple clients allocating the blocks for same range of rowPos and only one thread can successfully register its block in the versioned vector. (i.e., the index structure).

Subsequently, at 1160, the offset of the rowPos X in the block associated with the block handle can be computed. The timestamp value at the offset computed above can be stored, at 1170, using the block pointer in the block handle as the starting offset i.e. offset 0. For example, the timestamp can be 8 byte value that is written as an atomic data type (like long). RowState needs additional computation (as described earlier) and processing of using CAS operations to ensure the concurrent threads setting row state of other rows associated with the same row state word will not over-write the row state of the rowPos X.

Thereafter, at 1180, the page associated with the block handle can be dirtied (i.e., ready for garbage collection, etc.). Next, at 1190, the block handle from the latest versioned data object can be checked, and if it is not the same as above, then the process can repeat from 1130. Most of the time, the versioned vector write API ensures the new data is available in all the versioned data object, but for random writes, the clients also need to ensure that data is available in all the versions of the data object. The API used to get the block handle from the latest versioned data object might wait for shorter duration (not significant) due to concurrent grow of the versioned vector by the other threads. In addition, it can be ensured that any latest versioned data object reflects the new block allocated by the writing thread.

Figure 12:
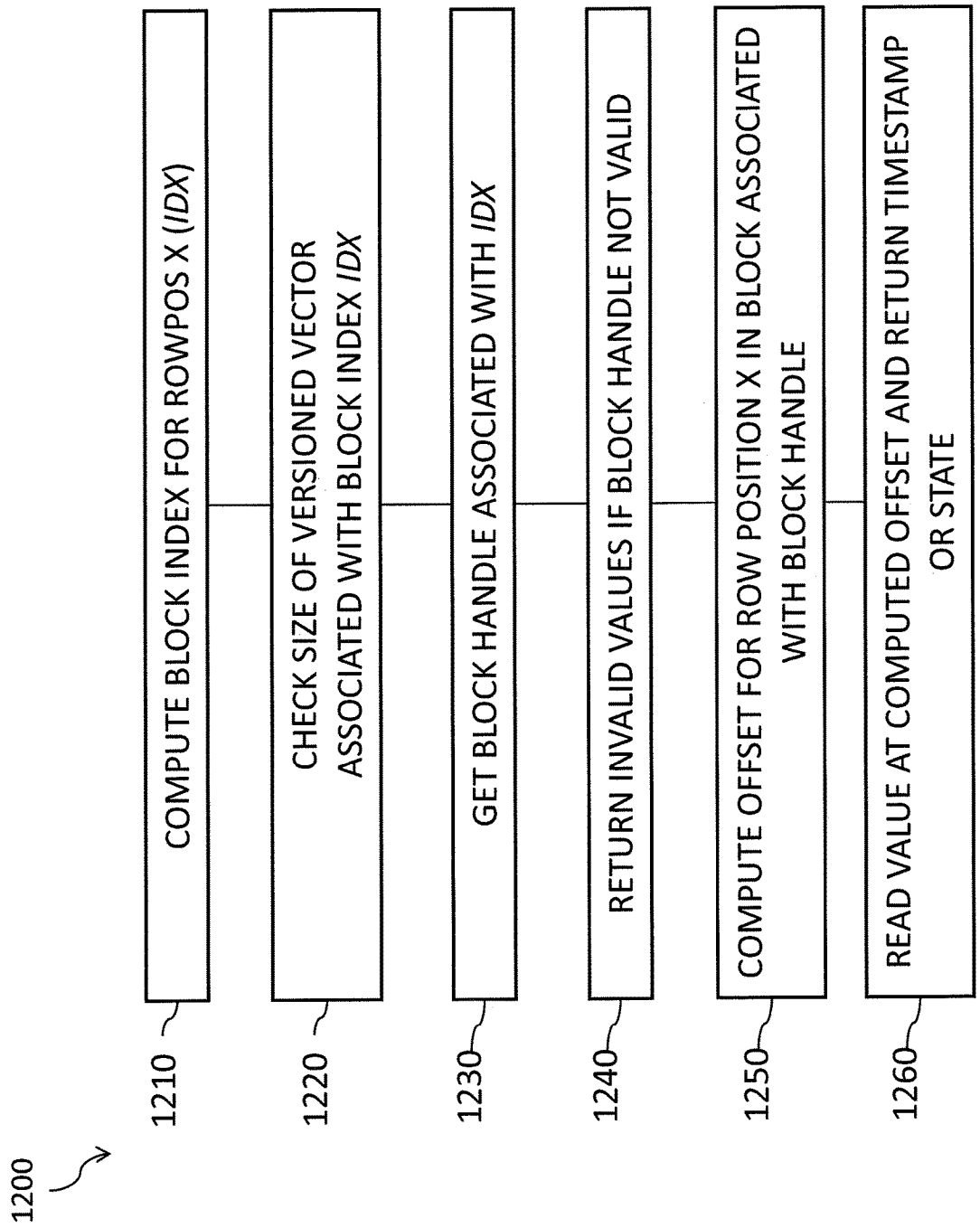
FIG. 12 is a process flow diagram illustrating reading of multi-version concurrency control data.

Diagram 1200 of FIG. 12 illustrates a process for a client that attempts (e.g., for rowPOS X) to read an MVCC timestamp or row state. Initially, at 1210, the block index for the given rowPos X (idx) can be computed. Next, at 1220, the size of the versioned vector associated with the MVCC blocks can be checked against idx. If it is not covered by the versioned vector then return invalid value (i.e. max timestamp for timestamps and ROWSTATE_INVISIBLE for row state blocks). The block handle associated with idx can then, at 1230, be obtained from the latest version of the data object. If the block handle is not valid then, at 1240, invalid values can be returned (i.e. max timestamp for time stamp blocks and ROWSTATE_INVISIBLE for row state blocks, etc.). Subsequently, at 1250, the offset of the rowPos X in the block associated with the block can be computed. Finally, at 1260, the value of the computed offset can be read using the pointer in the block handle as offset 0. For timestamp values, an 8 byte value stored at the offset can be returned. For row state, only state (CHECK_CTS, VISIBLE, CHECK_CTS_DTS and INVISIBLE) can be returned based on the 2 bits located on the rows state word.

Figure 13:
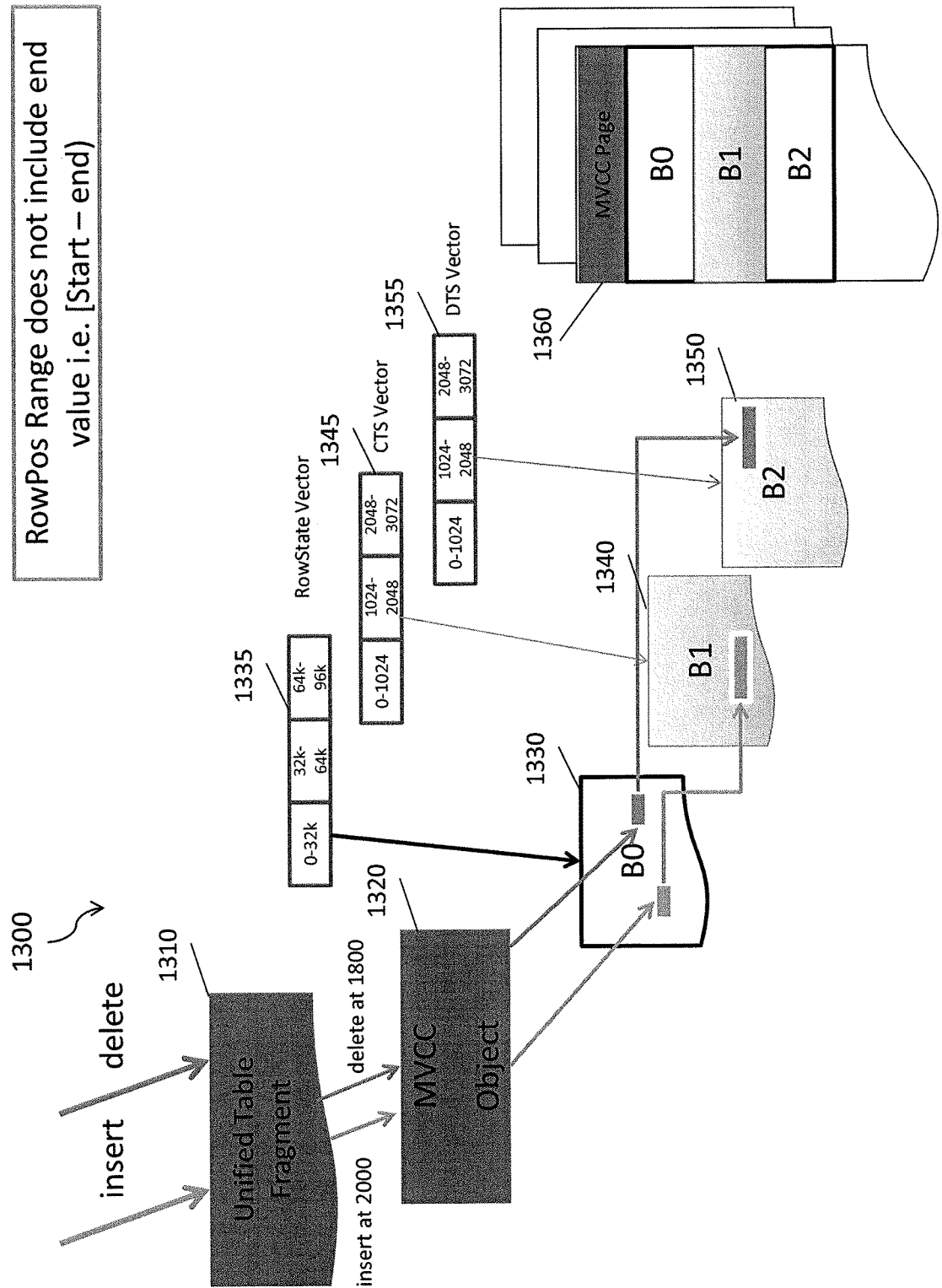
FIG. 13 is a diagram illustrating writing of multi-version concurrency control data.

FIG. 13 is a diagram 1300 illustrating the write operations in a unified table fragment 1310. Initially, a client seeks to insert an entry at rowPos 200 of the unified table fragment 1310. The corresponding MVCC information is updated using the MVCC object 1320. The inserting thread accesses the creation time stamp block by computing the index in the CTS vector 1345 and retrieves the timestamp block 1340. Once the block is retrieved, the insert thread will compute the offset in the timestamp block 1340 and store its timestamp (temporary timestamp for DML tasks and commit timestamp by post-commit operation). Once the CTS information is updated, the row state information of the rowPos 2000 is modified by retrieving the row state block 1330 (which forms part of an MVCC page 1360) associated with the rowPos 2000 (retrieved based on the computation that uses rowPos). The insert thread will complete its operation by storing the row state CHECK_CTS at the computed offset (associated with rowPos 2000) in the row state block.

The other illustration is the deletion of a row associated with the rowPos 1800 in the unified table fragment. The deleting thread updates its MVCC information by accessing the MVCC Object 1320. The delete thread computes the index into the index structure DTS vector 1355 for the rowPos 1800 and retrieves the timestamp block information 1350 (if there is no block at the computed slot then the writer threads will allocate and register its MVCC block information in the index structure before proceeding to write the MVCC data in the timestamp blocks). After retrieving the valid timestamp block information, the delete thread will write its timestamp information in the computed offset with in the block. Deletion of a row is completed by modifying its associated row state information in the row state block 1330 (computed based on the rowPos) pointed by the row state vector 1335.

Figure 14:
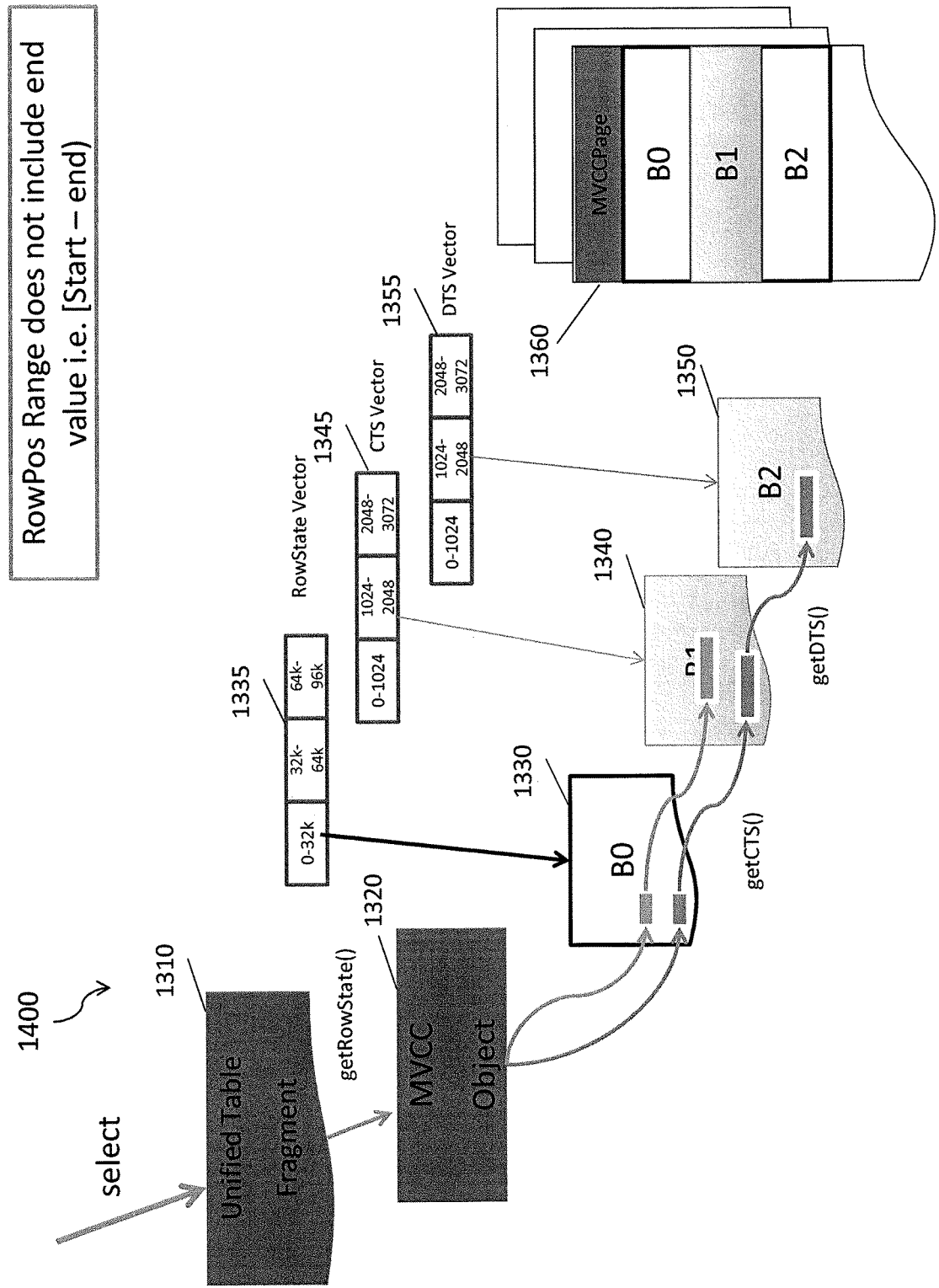
FIG. 14 is a diagram illustrating reading of multi-version concurrency control data.

FIG. 14 is a diagram 1400 illustrating a read operation. Initially, a select operation is initiated on the unified table fragment 1310. Thereafter, the MVCC object 1320 is accessed to determine the row state for the applicable row or rows. The row state is identified using the row state vector 1335 via the block located at the block index computed based on the rowPos value 1330 linked to the MVCC object 1320. Depending on the row state information, one or more of the check CTS vector (via the block 1340) and/or the check DTS vector 1355 (via the block 1350) are accessed to get corresponding timestamps to compute the visibility of the rows based on the read snapshot timestamp associated with the consistent view.

Figure 15:
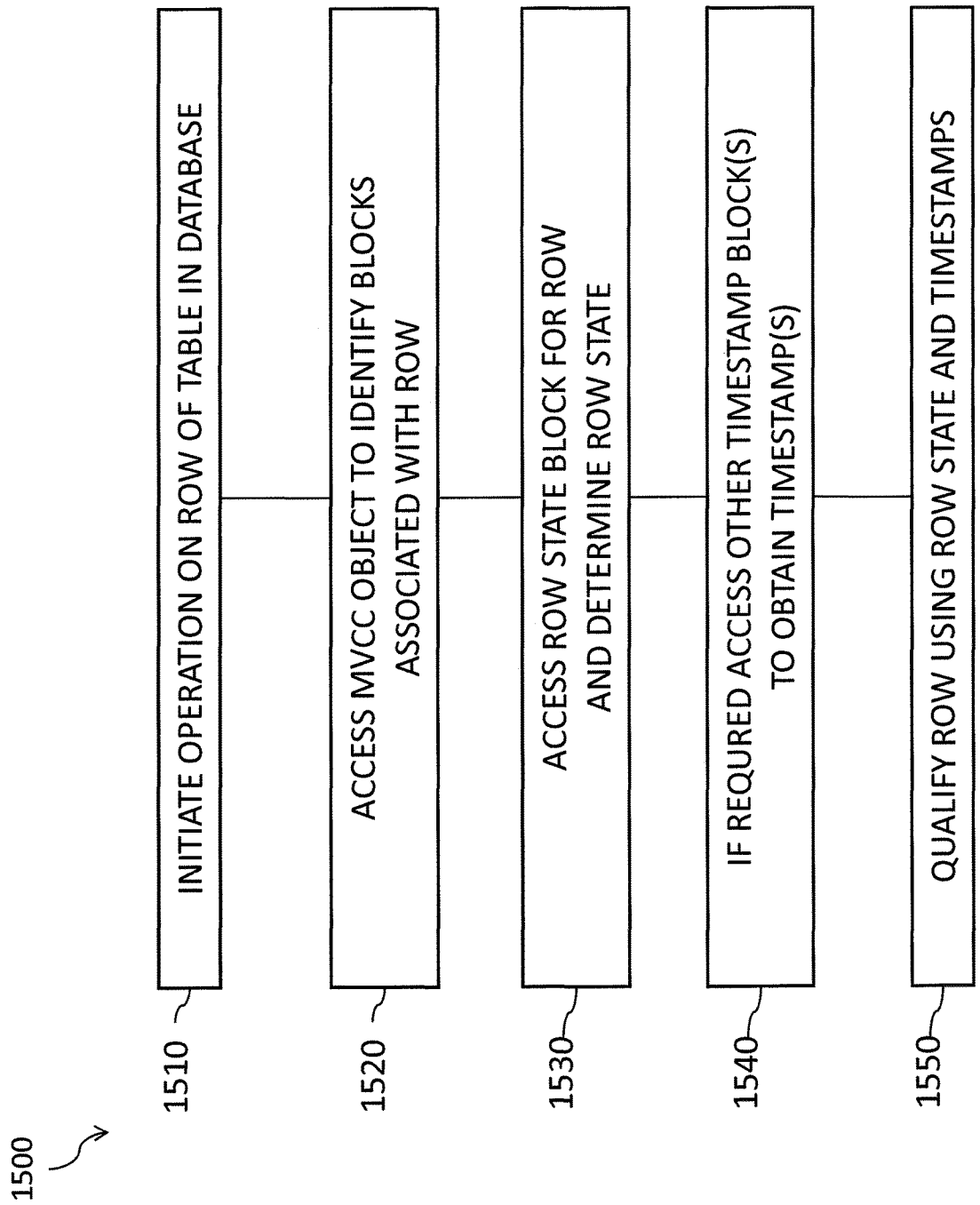
FIG. 15 is a process flow diagram that illustrates operation of a lockless index for multi-version concurrency control.

FIG. 15 is a process flow diagram 1500 in which, at 1510, an operation on a row of a table of a database is initiated. Thereafter, at 1520, a multi-version concurrency control (MVCC) object is accessed to identify a first block associated with the row. Subsequently, at 1530, the first block is accessed to determine a row state for the row. The first block (which can be at any position) can be accessed based on a computed block index and offset within the block (which can be computed using a row position value). Further, based on the row state, at 1540, at least one other block is accessed to obtain at least one timestamp for the row. Later, at 1550, the at least one timestamp is stored. In the foregoing, the term first block simply refers to a first identified block and does not require any particular location of such block.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
   executing a first query at a database by at least performing a first operation on a row of a table of the database, the performance of the first operation including:
   accessing a multi-version concurrency control (MVCC) object to identify a row state block and a timestamp block associated with a row position of the row;
   accessing the row state block to update a state of the row, the row state block being updated at a first offset computed based on the row position of the row; and
   accessing the timestamp block to update at least one a commit timestamp and a delete timestamp associated with the row, the timestamp block being updated at a second offset computed based on the row position of the row; and
   responding to the first query or a second query requiring a second operation to be performed on the row of the table concurrently with the first operation by at least:
   accessing the MVCC object to retrieve the state of the row;
   in response to the state of the row indicating that the row is visible, performing the second operation on the row concurrently with the first operation; and
   in response to the state of the row indicating a check on at least one of the commit timestamp and the delete timestamp associated with the row, accessing the MVCC object to retrieve the at least one of the commit timestamp and the delete timestamp associated with the row, performing the second operation on the row concurrently with the first operation based on a timestamp of the second operation being at least one of greater than the commit timestamp associated with the row and less than the delete timestamp associated with the row, the timestamp of the second operation being greater than the commit timestamp of the row indicating that the first operation is committed prior to the second operation, and the timestamp of the second operation being less than the delete timestamp of the row indicating that the row is deleted subsequent to the second operation.

2. The method of claim 1 further comprising:
   accessing a versioned vector at a slot computed using bit shift operations based on the row position of the row to obtain a block handle, the block handle comprising a pointer to the block and a handle to a page associated with the block.

3. The method of claim 1, wherein the first offset and/or the second offset are computed using one or more bit shift operations.

4. The method of claim 2 further comprising:
   registering the block handle in an index structure comprising a plurality of block handles.

5. The method of claim 4, wherein there are two threads attempting the insert a block handle in the index structure such that a first thread inserts the block handle in the index structure using an atomic operation and the other thread will use the registered value by destroying its own allocated block.

6. The method of claim 2, wherein the page is persisted.

7. The method of claim 1, wherein the first operation comprises an insert operation and/or a delete operation, and wherein the second operation comprises a read operation.

8. The method of claim 1, wherein the row state block comprises a row state vector encapsulating a plurality of row states associated with rows of the table.

9. The method of claim 1, further comprising:
   performing garbage collection to at least clear and free a memory associated with the row based at least on a minimum timestamp of one or more active read operations being greater than the delete timestamp of the row, the performing of the garbage collection further setting the state of the row to indicate the row as being invisible.

10. A non-transitory computer program product storing instructions which, when executed by at least one hardware data processor forming part of at least one computing device, results in operations comprising:
    executing a first query at a database by at least performing a first operation on a row of a table of the database, the performance of the first operation including:
    accessing a multi-version concurrency control (MVCC) object to identify a row state block and a timestamp block associated with a row position of the row;
    accessing the row state block to update a state of the row, the row state block being updated at a first offset computed based on the row position of the row; and
    accessing the timestamp block to update at least one a commit timestamp and a delete timestamp associated with the row, the timestamp block being updated at a second offset computed based on the row position of the row; and
    responding to the first query or a second query requiring a second operation to be performed on the row of the table concurrently with the first operation by at least:
    accessing the MVCC object to retrieve the state of the row;
    in response to the state of the row indicating that the row is visible, performing the second operation on the row concurrently with the first operation; and
    in response to the state of the row indicating a check on at least one of the commit timestamp and the delete timestamp associated with the row, accessing the MVCC object to retrieve the at least one of the commit timestamp and the delete timestamp associated with the row, performing the second operation on the row concurrently with the first operation based on a timestamp of the second operation being at least one of greater than the commit timestamp associated with the row and less than the delete timestamp associated with the row, the timestamp of the second operation being greater than the commit timestamp of the row indicating that the first operation is committed prior to the second operation, and the timestamp of the second operation being less than the delete timestamp of the row indicating that the row is deleted subsequent to the second operation.

11. The computer program product of claim 10, wherein the operations further comprise:
accessing a versioned vector at a slot computed using bit shift operations based on the row position of the row to obtain a block handle, the block handle comprising a pointer to the block and a handle to a page associated with the block.

12. The computer program product of claim 10, wherein the first offset and/or the second offset are computed using one or more bit shift operations.

13. The computer program product of claim 12, wherein the operations further comprise:
registering the block handle in an index structure comprising a plurality of block handles.

14. The computer program product of claim 13, wherein there are two threads attempting the insert a block handle in the index structure such that a first thread inserts the block handle in the index structure using an atomic operation and the other thread will use the registered value by destroying its own allocated block.

15. The computer program product of claim 10, wherein the database operation comprises: inserting data, deleting data, or reading data.

16. The computer program product of claim 10, wherein the first operation comprises an insert operation and/or a delete operation, and wherein the second operation comprises a read operation.

17. The computer program product of claim 10, wherein the row state block comprises a row state vector encapsulating a plurality of row states associated with rows of the table.

18. A system comprising:
at least one data processor; and
at least one memory storing instructions which, when executed by the at least one data processor, results in operations comprising:
executing a first query at a database by at least performing a first operation on a row of a table of the database, the performance of the first operation including:
accessing a multi-version concurrency control (MVCC) object to identify a row state block and a timestamp block associated with a row position of the row;
accessing the row state block to update a state of the row, the row state block being updated at a first offset computed based on the row position of the row; and
accessing the timestamp block to update at least one a commit timestamp and a delete timestamp associated with the row, the timestamp block being updated at a second offset computed based on the row position of the row; and
responding to the first query or a second query requiring a second operation to be performed on the row of the table concurrently with the first operation by at least:
accessing the MVCC object to retrieve the state of the row;
in response to the state of the row indicating that the row is visible, performing the second operation on the row concurrently with the first operation; and
in response to the state of the row indicating a check on at least one of the commit timestamp and the delete timestamp associated with the row, accessing the MVCC object to retrieve the at least one of the commit timestamp and the delete timestamp associated with the row, performing the second operation on the row concurrently with the first operation based on a timestamp of the second operation being at least one of greater than the commit timestamp associated with the row and less than the delete timestamp associated with the row, the timestamp of the second operation being greater than the commit timestamp of the row indicating that the first operation is committed prior to the second operation, and the timestamp of the second operation being less than the delete timestamp of the row indicating that the row is deleted subsequent to the second operation.

* * * * *